(12) United States Patent
Brown

(10) Patent No.: US 8,773,432 B2
(45) Date of Patent: Jul. 8, 2014

(54) TRIANGULATION FOR ACCELERATED MULTI-RESOLUTION RENDERING OF STROKED PATHS

(75) Inventor: Donald P. Brown, Bothell, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1093 days.

(21) Appl. No.: 12/201,347

(22) Filed: Aug. 29, 2008

(65) Prior Publication Data

US 2013/0120391 A1　May 16, 2013

Related U.S. Application Data

(63) Continuation-in-part of application No. 12/105,497, filed on Apr. 18, 2008, now Pat. No. 8,243,070.

(51) Int. Cl.
*G06T 15/30* (2011.01)
*G06T 15/00* (2011.01)
*G06T 17/00* (2006.01)

(52) U.S. Cl.
USPC .......................... 345/423; 345/419; 345/420

(58) Field of Classification Search
USPC ......... 345/441, 423, 606, 420, 422, 643, 581, 345/419, 424
See application file for complete search history.

(56) References Cited

U.S. PATENT DOCUMENTS

| | | | |
|---|---|---|---|
| 5,261,029 A | 11/1993 | Abi-Ezzi et al. | |
| 5,428,718 A | 6/1995 | Peterson et al. | |
| 6,067,094 A | 5/2000 | Schuster | |
| 6,211,883 B1 | 4/2001 | Goel | |
| 6,664,960 B2 | 12/2003 | Goel et al. | |
| 6,911,980 B1 | 6/2005 | Newell et al. | |
| 6,996,505 B1* | 2/2006 | Edelsbrunner et al. | 345/428 |
| 7,023,435 B1* | 4/2006 | Litke et al. | 345/420 |
| 7,034,823 B2* | 4/2006 | Dunnett | 345/422 |
| 7,109,987 B2 | 9/2006 | Goel et al. | |
| 7,142,206 B1 | 11/2006 | Moreton | |
| 7,212,205 B2 | 5/2007 | Uesaki et | |
| 7,324,691 B2* | 1/2008 | Li et al. | 382/181 |
| 7,930,653 B2* | 4/2011 | Ivansen et al. | 716/50 |
| 7,948,489 B1* | 5/2011 | Barnes et al. | 345/423 |
| 8,072,452 B1* | 12/2011 | Brown | 345/423 |
| 8,243,070 B1* | 8/2012 | Brown | 345/423 |
| 8,274,513 B1* | 9/2012 | Ubieto | 345/424 |
| 2005/0116950 A1* | 6/2005 | Hoppe | 345/423 |

(Continued)

OTHER PUBLICATIONS

Markosian, Lee et al., "Art-based Rendering with Continuous Levels of Detail", ACM 2000, pp. 59-66.*

(Continued)

*Primary Examiner* — Chante Harrison
(74) *Attorney, Agent, or Firm* — Wolfe-SBMC

(57) ABSTRACT

A method, system, and computer-readable storage medium are disclosed for generating a multi-resolution triangulation of a stroked path. In one embodiment, one or more core triangles in a triangulation of a stroked path may be generated. A plurality of refinement triangles in the triangulation of the stroked path may be generated until a refinement threshold is met. The plurality of refinement triangles may include a plurality of sets of triangles, wherein each set is generated for a particular level of refinement. The stroked path may be rendered to an imaging device based on the one or more core triangles and the plurality of refinement triangles. The triangulation may be generated in a manner that is efficient and computationally stable.

25 Claims, 11 Drawing Sheets

(56) References Cited

U.S. PATENT DOCUMENTS

2005/0237341 A1* 10/2005 Gangnet et al. ............... 345/606
2007/0002043 A1* 1/2007 Guenter et al. ............... 345/420
2012/0001908 A1* 1/2012 Kikuta et al. ................. 345/419

OTHER PUBLICATIONS

Floater, Michael et al., "Parameterization of Manifold Triangulations", 2001, p. 1-12.*

* cited by examiner

TRIANGULATION FOR ACCELERATED MULTI-RESOLUTION RENDERING OF STROKED PATHS

This application is a Continuation-in-Part of U.S. application Ser. No. 12/105,497, which was filed Apr. 18, 2008, now U.S. Pat. No. 8,243,070 and which is herein incorporated by reference in its entirety.

BACKGROUND

1. Field of the Invention

The present invention is directed to computer systems; and more particularly, it is directed to tessellation of geometric objects using computer systems.

2. Description of the Related Art

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP, PCI, or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes a plurality of execution channels that can be used simultaneously for highly parallel processing. A GPU may include various built-in and configurable structures for rendering digital images to an imaging device.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of digital images. The geometric objects may typically be located in two-dimensional or three-dimensional space. Suitable image editors, such as Adobe Illustrator® (available from Adobe Systems, Inc.), may be used to perform operations on these objects. Typical operations include rotation, translation, stretching, skewing, changing depth order, and combining objects with other objects. While raster graphics may often lose apparent quality when scaled to a higher resolution, vector graphics may scale to the resolution of the device on which they are ultimately rendered.

To render vector graphics on raster-based imaging devices (e.g., most display devices and printers), the geometric objects are typically converted to raster graphics data in a process called rasterization. Prior to final rasterization, surfaces defined by the geometric objects may be covered with polygons (e.g., triangles or quadrilaterals) in a process called tessellation or triangulation. The polygons may also be referred to as tessellae, and the arrangement of polygons may be referred to as a triangulation or a mesh. Each polygon is defined by at least three vertices, and each vertex may be characterized by color and alpha values. Because tessellation of a shaded surface may produce many polygons, a surface may be rendered with fine variations in the color and alpha values.

In tessellating a two-dimensional geometric object that includes a curved path, the curve may be approximated by a series of line segments. The polygon may then be tessellated using conventional polygon triangulation techniques such as Siedel, Watson, Delaunay, etc., to produce a set of triangles. The approximation of the curve may be referred to as "flattening." The resulting polygon typically has a large number of vertices in the area approximating the curve. However, the number of line segments and the corresponding number of vertices used in approximating the curve may be dependent upon the resolution of the target output device (e.g., a display device or printer).

One prior approach to tessellation uses "cancelling triangles" to produce a multi-cover triangulation describing the interior of a two-dimensional geometric object. Using this approach, a point may be chosen (e.g., the center of the object bounds), and triangles connecting every edge to the chosen point may be produced. However, this approach may produce undesirably "spiky" triangles on polygons having a high vertex count such as polygons having segments that approximate a curve. FIG. 1A illustrates an example triangulation 50 produced using this approach.

As the resolution of the polygonal boundary increases, the triangulation may become even "spikier" using this prior approach. Furthermore, the increased "spikiness" of a triangulation may increase the number of pixels and/or tiles that include multiple triangles and are therefore painted more than once in rendering the polygon. Thus, the increased "spikiness" of a triangulation may place increased demands on the computing resources used in rendering, and performance may be degraded accordingly. For example, when a GPU is used to render the triangulated polygon, a pixel shader of the GPU may be invoked more often for areas encompassing particularly "spiky" triangles, such as the central region of the example triangulation 50.

SUMMARY

Various embodiments of systems, methods, and computer-readable storage media for generating a triangulation of a stroked path are disclosed. Instead of computing a stroke envelope approximating the boundary of a stroke region, a triangulation that approximates the stroke region may be generated. In one embodiment, one or more core triangles in a triangulation of a stroked path may first be generated. In one embodiment, a plurality of refinement triangles in the triangulation of the stroked path may be generated. The plurality of refinement triangles may be generated until a refinement threshold is met. In one embodiment, the plurality of refinement triangles may be generated one level of refinement at a time until the refinement threshold is met. Thus, generating the refinement triangles may comprise generating a second portion of the refinement triangles in response to determining that at least one edge approximating an offset curve in a first portion of the refinement triangles fails to meet the refinement threshold. The stroked path may be rendered to an imaging device based on the one or more core triangles and the plurality of the refinement triangles in the triangulation of the stroked path. In rendering the stroked path, the triangulation may be sent to a graphics processing unit (GPU).

In one embodiment, a "multi-resolution" triangulation of a stroked path may be generated. Triangles in the triangulation of a stroked path may be stored in the order of refinement, where the order of refinement may correspond to the order in which the triangles are generated. When the desired level of refinement or prevision is reached in rendering a stroked path, the remaining triangles in the list may be ignored because they represent refinements that are deemed to be unnecessary to display at the desired precision. The triangulation of a stroked path may be generated once, cached (e.g., on the GPU), and potentially reused (e.g., while zooming and/or panning).

Figure 1A:
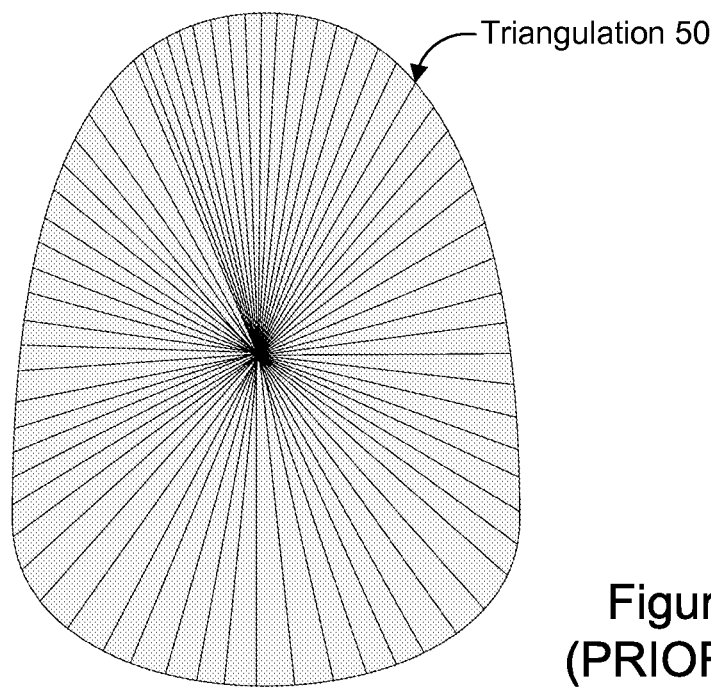
FIG. 1A illustrates an example triangulation produced using a prior approach for tessellating polygons.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, triangulations that are "tuned" for efficient use of computational resources may be produced. Two-dimensional geometric objects that include curved regions or other high-vertex areas may be triangulated for efficient rendering using a graphics processing unit (GPU). In one embodiment, stroked paths may be triangulated for efficient rendering using a GPU. In one embodiment, the resulting triangulation may be used for efficient rendering at a plurality of different resolutions on a target imaging device. In some embodiments, a geometric object having at least one curved path may have each of its curves approximated as a series of line segments prior to application of the triangulation techniques described herein.

Figure 1B:
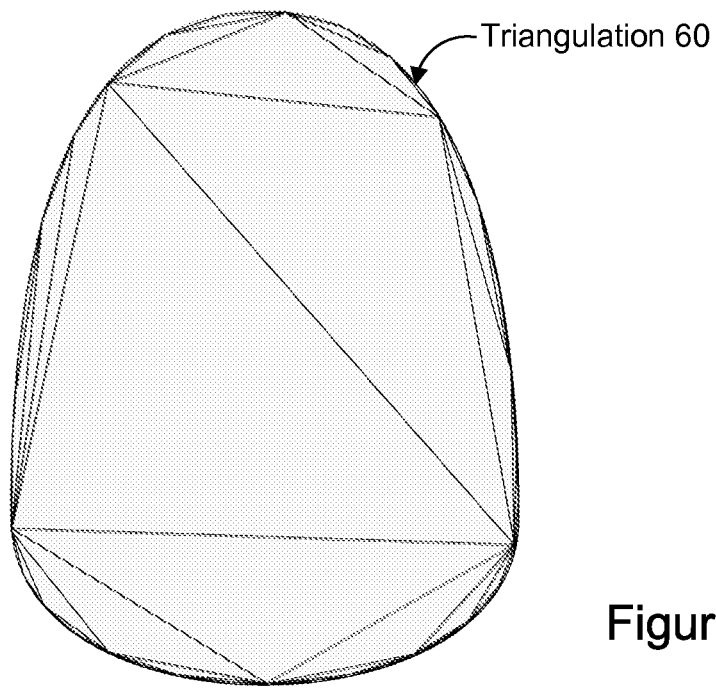
FIG. 1B illustrates an example triangulation produced according to one embodiment.

FIG. 1B illustrates an example triangulation produced according to one embodiment. In comparison to the triangulation 50 shown in FIG. 1A, techniques described herein may be used to produce a triangulation 60 that includes triangles that are generally less "spiky" (e.g., less elongated). Because the triangulation 60 generally avoids having regions with the high density of triangles shown in the center of the "prior art" triangulation 50, the pixels and/or tiles of the triangulation 60 may be painted with fewer visits (e.g., fewer invocations of a pixel shader program within a GPU). Further details of the triangulation techniques are discussed below.

Figure 2:
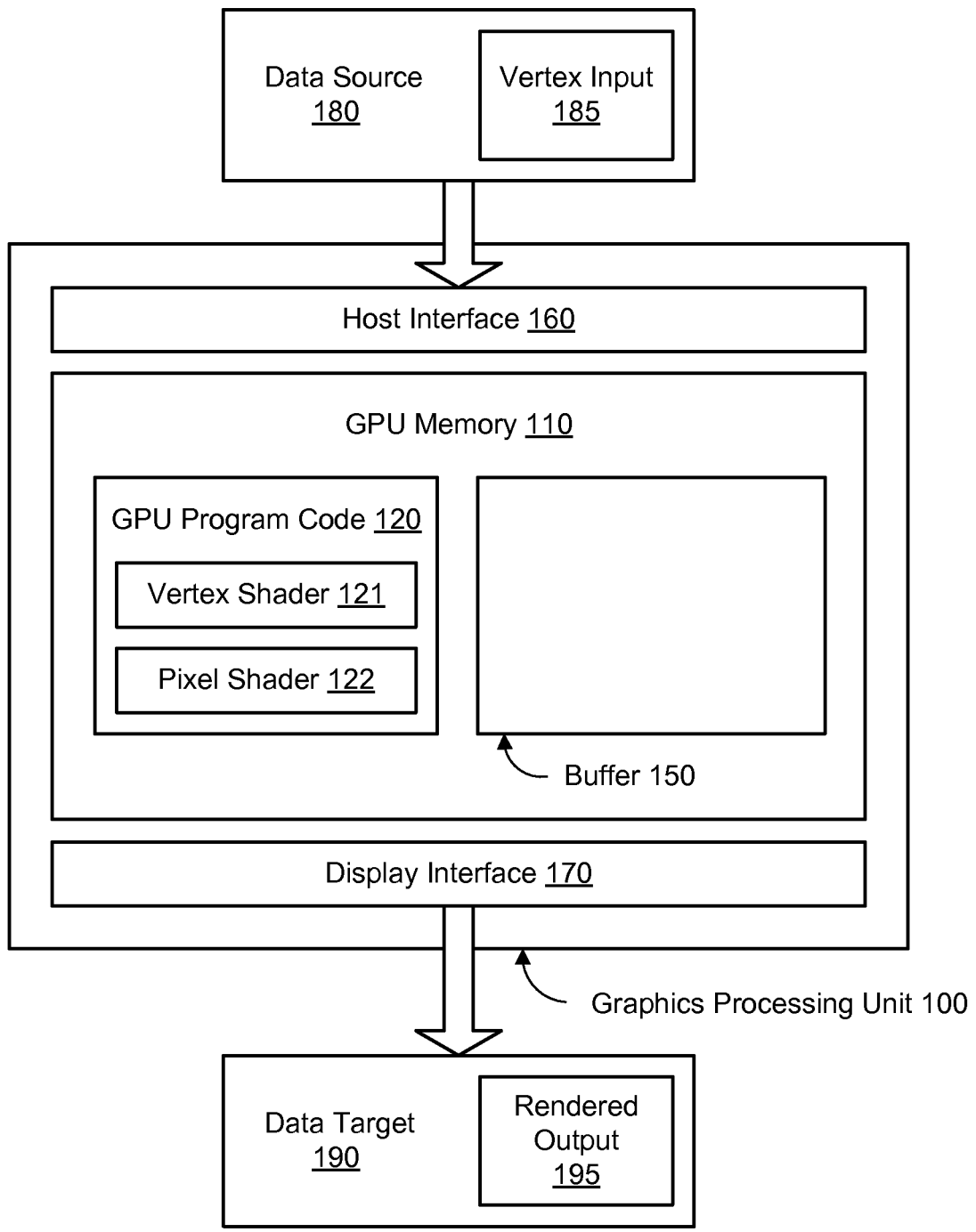
FIG. 2 is a block diagram illustrating one embodiment of a graphics processing unit (GPU) configured to render objects triangulated according to the techniques described herein.
Figure 9:
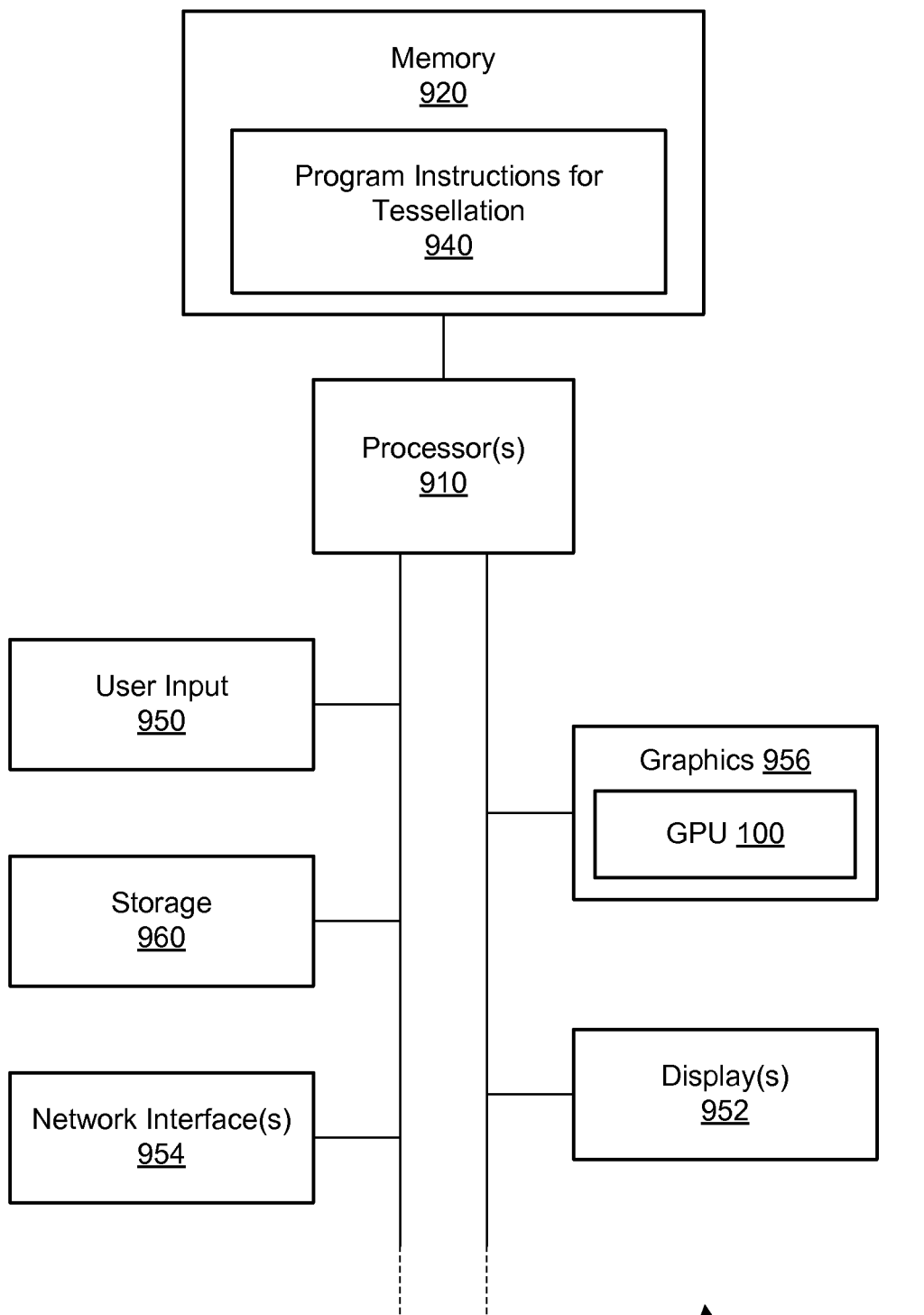
FIG. 9 is a block diagram illustrating constituent elements of a computer system that is configured to implement embodiments of the system and method for triangulation.

FIG. 2 is a block diagram illustrating one embodiment of a GPU 100 configured to render objects triangulated according to the techniques described herein. The GPU 100, also referred to herein as a graphics processor, may comprise a dedicated graphics rendering device associated with a computer system. An example of a suitable computer system 900 for use with a GPU is illustrated in FIG. 9. Turning back to FIG. 2, the GPU 100 may include numerous specialized components configured to optimize the speed of rendering graphics output. For example, the GPU 100 may include specialized components for rendering three-dimensional models, for applying textures to surfaces, etc. For the sake of illustration, however, only a limited selection of components is shown in the example GPU 100 of FIG. 2. It is contemplated that GPU architectures other than the example architecture of FIG. 2 may be suitable for implementing the techniques described herein. The GPU 100 may implement one or more application programmer interfaces (APIs) that permit programmers to invoke the functionality of the GPU. Suitable GPUs may be commercially available from vendors such as NVIDIA Corporation, ATI Technologies, and others.

The GPU 100 may include a host interface 160 configured to communicate with a data source 180 (e.g., a communications bus and/or processor(s) 910 of a host computer system 900, or the host system itself). For example, the data source 180 may provide input data (e.g., a scene comprising one or more geometric objects, one or more polygons, etc.) and/or executable program code to the GPU 100. In some embodiments, the host interface 160 may permit the movement of data in both directions between the GPU 100 and the data source 180. The GPU 100 may also include a display interface 170 for providing output data to a data target 190. The data target 190 may comprise an imaging device 952 such as a display or printer. For example, if data target 190 comprises a display device 952, the GPU 100 (along with other graphics components and/or interfaces 956) may "drive" the display 952 by providing graphics data at a particular rate from a screen buffer (e.g., the buffer 150).

In one embodiment, the GPU 100 may include internal memory 110. The GPU memory 110, also referred to herein as "video memory" or "VRAM," may comprise random-access memory (RAM) which is accessible to other GPU components. As will be described in greater detail below, the GPU memory 110 may be used in some embodiments to store various types of data and instructions such as input data, output data, intermediate data, program instructions for performing various tasks, etc. In one embodiment, the GPU 100 may also be configured to access memory 920 of a host computer system 900 via the host interface 160.

In one embodiment, program instructions 940 may be stored in the memory 920 of the host computer system 900 and executed by the host computer system 900 to generate rendered output 195 based on vertex input 185. The vertex input 185 may include a scene comprising one or more geometric objects (e.g., polygons or paths). Each geometric object may comprise a plurality of vertices. As will be described in greater detail below, each geometric object to be rendered may be triangulated or tessellated, thereby generating a triangulation or tessellation comprising a plurality of polygons (typically triangles or quadrilaterals) covering the area of the original polygon.

In one embodiment, the GPU 100 may include GPU program code 120 that is executable by the GPU 100 to perform aspects of the techniques discussed herein. For example, the regions defined by the paths in the geometric input 185 may be rasterized to pixels during a rendering process including execution of the GPU program code 120 on the GPU 100. Elements of the GPU program code 120 may be provided to the GPU 100 by a host computer system (e.g., the data source 180) and/or native to the GPU 100. The GPU program code 120 may comprise a vertex shader 121 and/or a pixel shader 122. A vertex shader 121 comprises program instructions that are executable by the GPU 100 to determine properties (e.g., position) of a particular vertex. A vertex shader 121 may expect input such as uniform variables (e.g., constant values for each invocation of the vertex shader) and vertex attributes (e.g., per-vertex data). A pixel shader 122 comprises program instructions that are executable by the GPU 100 to determine properties (e.g., color) of a particular pixel. A pixel shader 122 may also be referred to as a fragment shader. A pixel shader 122 may expect input such as uniform variables (e.g., constant values for each invocation of the pixel shader) and pixel attributes (e.g., per-pixel data). In generating the rendered output 195, both the vertex shader 121 and the pixel shader 122 may be executed at various points in the graphics pipeline.

The GPU memory 100 may comprise one or more buffers 150, and each buffer 150 may comprise a two-dimensional array of pixel data (e.g., color values) and/or pixel metadata (e.g., depth values, stencil values, etc.). For example, the GPU memory 110 may comprise an image buffer 150. The image buffer 150 may store intermediate or final pixel values generated in the rendering process. In one embodiment, the image buffer 150 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer 150 may comprise a multi-sampling buffer usable for anti-aliasing.

The term "tessellation" or "triangulation" may refer to a collection of polygons (e.g., triangles) that cover a region (e.g., a region enclosed by a polygon or path). The term "tessellation" or "triangulation" may also refer to the process of generating such a set of triangles given a set of geometric objects (e.g., polygons or paths) as input. In one embodiment, the polygons or paths in the geometric input 185 may be tessellated (i.e., reduced to triangles) prior to sending the geometric input 185 to the GPU 100. For example, the tessellation may occur through tessellation techniques performed on the data source 180.

In one embodiment, performance gains may be achieved by creating a device-independent triangulation that does not need to be re-tessellated whenever the resolution of the target device 190 changes. The target resolution may change, for example, when redisplaying a scene including the geometric object upon zooming into or out of the scene. Further details of techniques for generating such a multi-resolution triangulation are discussed below.

In one embodiment, a geometric object (e.g., a polygon or path) to be triangulated may comprise an ordered set of points that describe the path of the exterior boundary. Each point may comprise a vertex of the path. In triangulating a polygon, as each point is received, the point may be pushed onto a stack. After pushing the new point onto the stack, the current depth of the stack may be determined. If the prime factorization of the current depth includes 2 (i.e., if the current depth is even), then at least one new triangle may be generated. In one embodiment, the number of new triangles generated at this stage is the same as the exponent of 2 in the factorization (e.g., the prime factorization) of the current depth. In other words, if the factorization of the current depth includes the factor $2^n$, then n new triangles may be generated after pushing the new point onto the stack. In one embodiment, the generation of a triangle includes popping three points (a, b, c) from the stack, defining a new triangle based on the points (a, b, c), and pushing two of the points (e.g., a and c) back onto the stack. In one embodiment, a triangulation (e.g., the triangulation 60) may be produced in this manner according to an algorithm expressed in the following pseudocode for the function TriangulatePoly:

```
sub TriangulatePoly(polypoints)
    pointstack = new pointstack
    pointstack.push(polypoints[0])
    pointstack.push(polypoints[1])
    for (i = 2; i < num(polypoints); i++)
        j = i;
        while j is even
            IssueTopTriangle(pointstack) // => decrement stack depth
            j = j/2
    while (pointstack.depth( ) > 2)
        IssueTopTriangle(pointstack)
sub IssueTopTriangle(pointstack)
    a = pointstack.pop( )
    b = pointstack.pop( )
    c = pointstack.pop( )
    IssueTriangle(a,b,c)
    pointstack.push(a)
    pointstack.push(c)
```

In one embodiment, the algorithm shown above comprises a buffered stream and may begin issuing triangles almost immediately. The stack of points may have depth $\log_2 n$, where n is the number of vertices in the polygon. The algorithm may have an effect of "cleaving off" edge triangles as powers of two of them are encountered. The size of the triangle generated upon reaching a power of two may increase with the size of the power of two. Consequently, triangles near the "core" or center of the polygon may be large, while triangles near the edge of the polygon may be smaller. Thus, in one embodiment, substantially the same triangulation 60 shown in FIG. 1B may be generated for any polygon having substantially the same shape, regardless of the number of vertices.

Although the small triangles near the outer boundary of a polygon may have some "spikiness," such triangles may tend to be smaller and more localized (e.g., near the edge) than the "spiky" triangles in a triangulation (e.g., triangulation 50) produced by the conventional technique. Thus, fewer pixels may be affected by the spikes in the triangulation 60 than in the conventional triangulation 50. Accordingly, any "spiky" triangles in the triangulation 60 may degrade performance less than their counterparts in the conventional triangulation 50.

In one embodiment, the techniques discussed above for generating a simpler triangulation (e.g., triangulation 60 as shown in FIG. 1B) may have little additional runtime overhead in comparison to prior approaches. The spikiness of a particular triangulation may be related to the number of pixels that have triangle edges running through them, i.e., to the number of multiple renders for a triangulated polygon. The conventional "fan" algorithm illustrated in FIG. 1A is O(n) in this characteristic, while the algorithm illustrated in FIG. 1B is O(log(n)). As the number of vertices increases, the GPU performance for conventional "fan" triangulations may decrease rapidly. However, GPU performance may remain substantially constant as the number of vertices increases for the triangulations (e.g., triangulation 60) produced using the techniques described herein.

In one embodiment, the vertex indices generated by the pseudocode shown above may be constant for all polygons with the same number of vertices, regardless of their shape. Furthermore, the sequence of vertex indices may progress in substantially the same way for polygons of any order. In one embodiment, the sequence of vertex indices may begin as follows, with the first vertex having index 0 and each set of three vertices (i.e., a vertex triple) forming the three vertices of a triangle:

0 1 2, 2 3 4, 0 2 4, 4 5 6, 6 7 8, 4 6 8, 0 4 8, 8 9 10, 10 11 12, 8 10 12, 12 13 14, 14 15 16, 12 14 16, 8 12 16, 0 8 16, . . .

In one embodiment, a constant index buffer comprising the sequence shown above may be sent to the GPU and cached for use in triangulating a plurality of polygons. The portion of the constant buffer that is relevant to a specific polygon may then be used in triangulating that polygon. The sequence may be truncated when the first invalid index is encountered for the given polygon. A small fan of order $\log_2(n)$ may then be added to the end of the sequence.

Figure 3A:
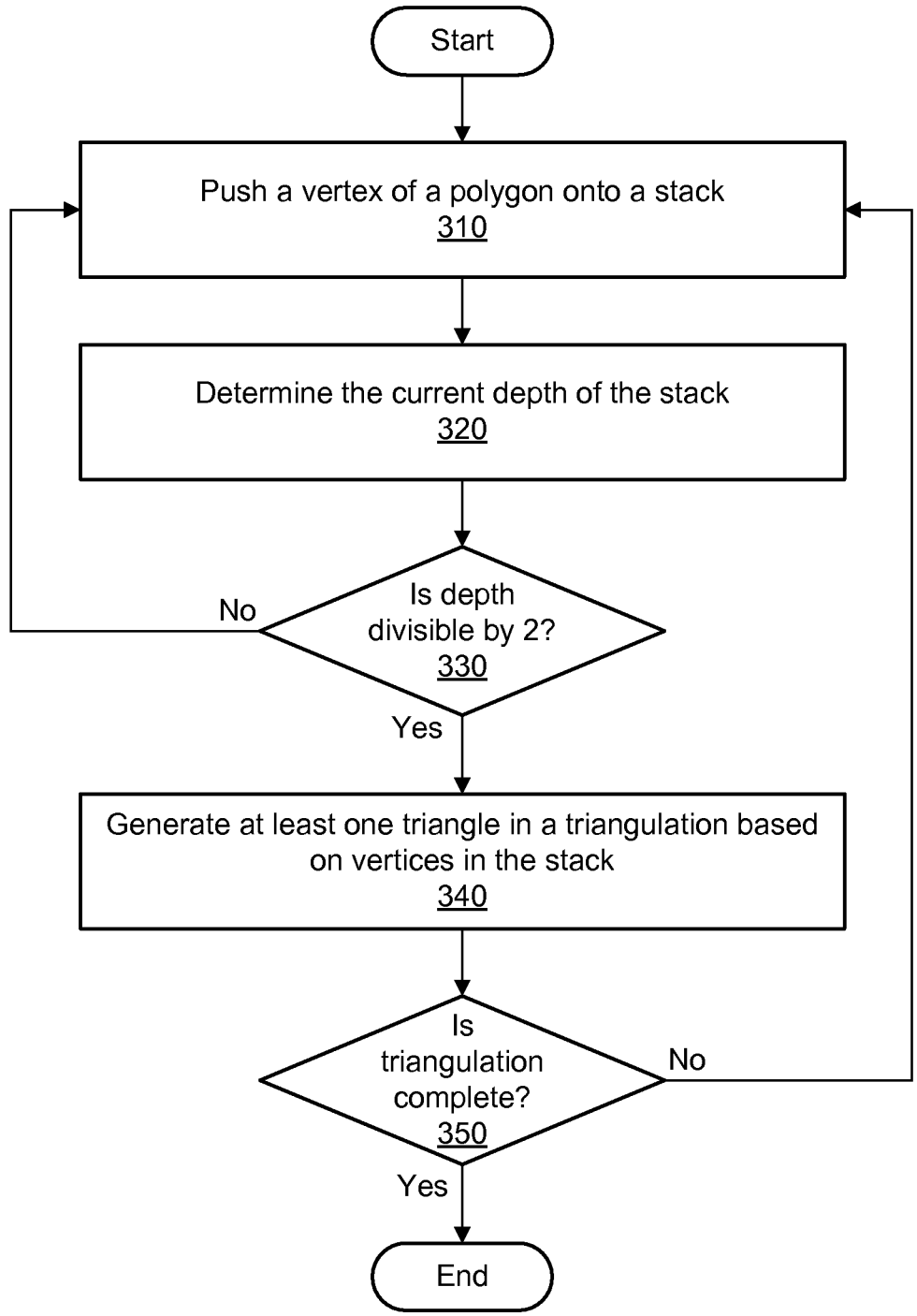
FIGS. 3A and 3B are flow diagrams illustrating aspects of a method for triangulation according to one embodiment.

FIG. 3A is a flow diagram illustrating aspects of a method for generating a triangulation of a polygon according to one embodiment. As shown in block 310, a plurality of vertices of the polygon may be pushed onto a stack. The plurality of vertices may be received in order, and each vertex may be pushed onto the stack as the vertex is received. In one embodiment, one or more of the operations shown in blocks 320, 330, and 340 may be performed after each vertex is pushed onto the stack.

As shown in block 320, the current depth of the stack may be determined. The current depth of the stack may comprise the number of vertices currently in the stack. As shown in block 330, it may be determined that the depth of the stack is divisible by 2. In one embodiment, the number of times (i.e., n) that the depth is divisible by 2 may be determined. As shown in block 340, at least one triangle in the triangulation may be generated in response to the determination made in block 330. In one embodiment, n triangles may be generated in the operation shown in block 340. The triangle(s) generated in block 340 may be generated based on a subset of vertices in the stack in the manner shown above by way of pseudocode. The depth of the stack may be reduced (e.g., by popping one or more of the vertices in the triangle) after generating a triangle in this manner. As indicated in block 350, the operations shown in blocks 310, 320, 330 and/or 340 may be performed a plurality of times until the triangulation of the polygon is complete (i.e., until all the vertices of the polygon have been pushed onto the stack and processed in the manner discussed above). Further aspects of the completion of the triangulation in one embodiment are discussed below with respect to FIG. 3B.

Figure 3B:
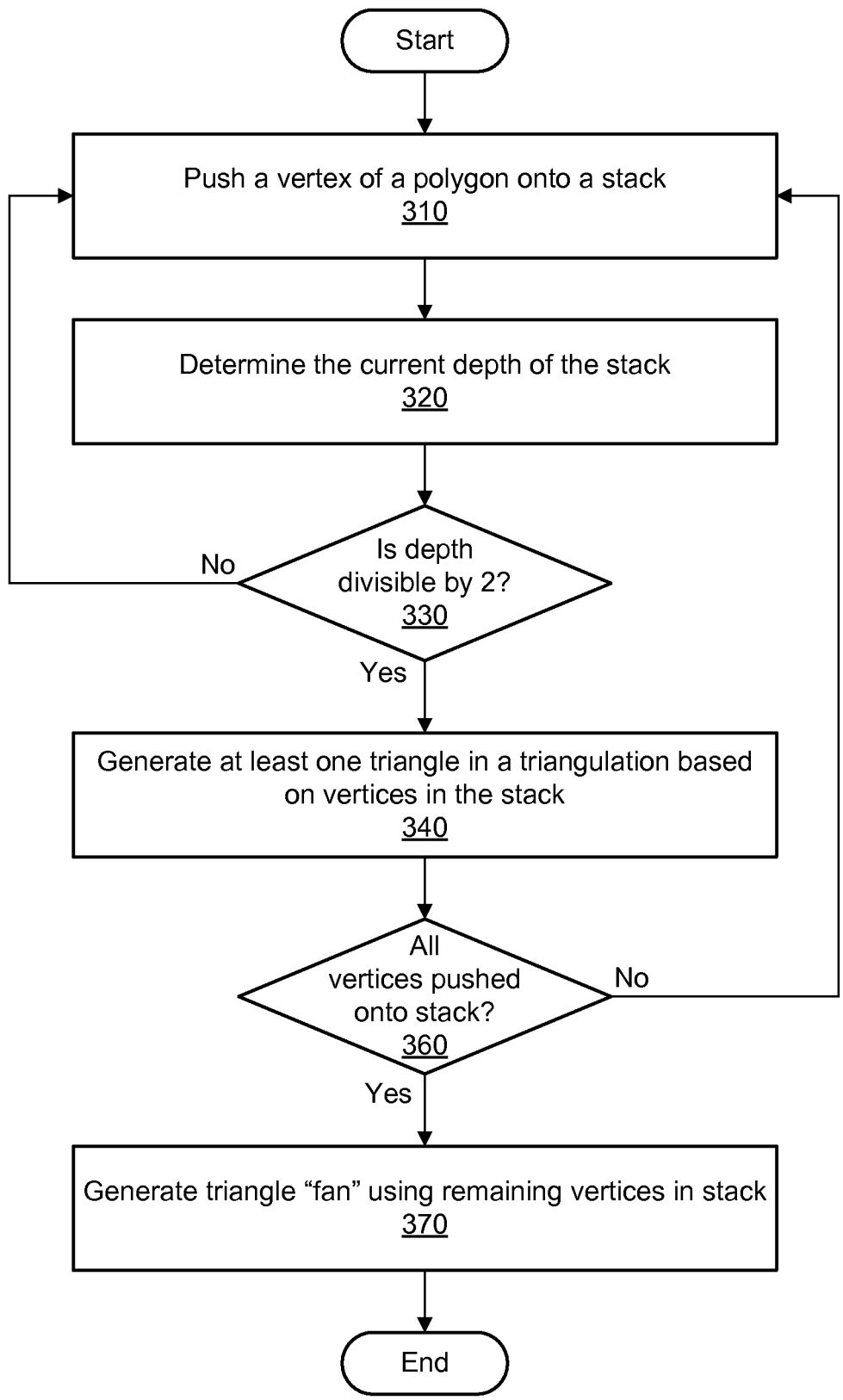

FIG. 3B is a flow diagram illustrating further aspects of a method for generating a triangulation of a polygon according to one embodiment. The operations shown in blocks 310, 320, 330, and 340 in FIG. 3B may be performed in the manner described above with respect to FIG. 3A. If it is determined in block 360 that all the vertices of the polygon have already been pushed onto the stack, then the remaining vertices in the stack (if any) may be processed to complete the triangulation. As shown in block 370, the remaining vertices in the stack may be used to generate one or more triangles until the vertices in the stack are substantially exhausted. In one embodiment, the operation shown in block 370 may generate a triangle "fan" using the remaining vertices in the stack. In one embodiment, the generation of each triangle in the fan may be performed in accordance with the IssueTopTriangle( ) pseudocode shown above (e.g., popping three vertices, generating a triangle therefrom, and pushing two of the vertices back onto the stack). The triangulation of the polygon may be complete when all the vertices have been pushed onto the stack and fewer than three vertices remain in the stack.

In one embodiment, a triangulation of two-dimensional polygons using the systems and methods described herein may be used to specify the shape of a marking operation. The interior triangles themselves may be of less interest. In one embodiment, the conventional requirement that triangles not overlap may be bypassed. A triangulation technique with greater speed and flexibility may thus be used.

In one embodiment, a triangulation technique may be based on the observation that the following theorem is true for all paths and for all choices of points on the paths: given a path P and two points A and B on P, the set of points in the interior of the path (by either winding or even/odd rules) is unchanged if the path is "cut" between A and B into $P_{AB}$+BA+$P_{BA}$+AB. For the even/odd rule, a point is in the interior if a ray drawn from the point to infinity crosses the boundary an odd number of times. If the ray crosses segment AB, then it also crosses BA, so the parity is unchanged. For fills using the winding rule, the mathematical definition is a line integral. The original whole circle line integral is broken into two chunks, but the chunks share an edge that has opposite orientations in the two pieces; thus their contributions to the integral have opposite sign and cancel. The remaining pieces sum to the original integral's value.

Figure 4:
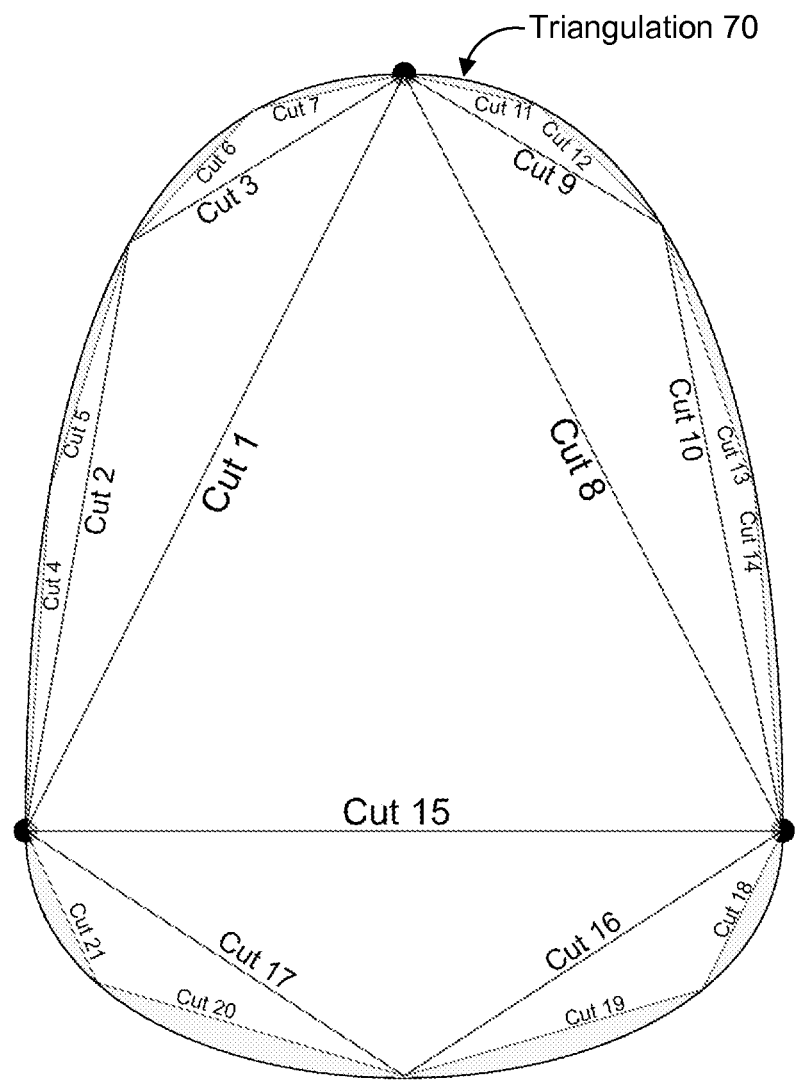
FIG. 4 is a block diagram illustrating the triangulation of an object using a plurality of "cuts" according to one embodiment.

FIG. 4 is a block diagram illustrating the triangulation 70 of an object using a plurality of "cuts" according to one embodiment. For the example object shown in FIG. 4, cuts 1 through 21 may be generated using the following techniques. In one embodiment, for each original segment in the path that defines the boundary of the object (e.g., each Bezier curve), the original path is initially "cut" along the line connecting the starting point of the segment to the endpoint of the segment. The cut may be performed in a manner similar to the technique of "earlopping." The initial cuts (e.g., cut 1, cut 8, and cut 15) may generate the following regions or pieces: a flat-edged interior region resulting from all the initial cuts, and, on the exterior side of each initial cut, an "edge" piece with one new flat edge and the other edge (e.g., curve segment) provided by the original segment. Because of the theorem discussed above, the initial cuts will not affect the interior points, regardless of the complexity of the segment. Thus, in one embodiment, the techniques illustrated in FIGS. 4 and 5 may be applied to convex paths, paths with holes, and multi-component paths as well as simple paths.

Each edge portion generated after the initial cuts (e.g., each portion including a segment on the exterior of the object) may be further subdivided as follows. As illustrated in FIG. 4, two cuts may be made on the curve segment of the edge portion: one cut (e.g., cut 2, cut 9, or cut 16) from the starting point of the curve to an "interior" point (e.g., the midpoint) on the curve segment that is not an endpoint, and another cut (e.g., cut 3, cut 10, or cut 17) from the same interior point to the endpoint of the segment. These cuts may break the edge portion into a triangle and two smaller edge pieces. The same technique may be applied to the newly generated edge portions until a desired (e.g., predetermined) threshold of precision is met. The precision threshold may relate to how closely the exterior line segments approximate the curves on the exterior of the initial object: in other words, whether the segment is flat enough. Therefore, as shown in the example of FIG. 4: the edge portion generated by cut 2 may be further divided by cut 4 and cut 5; the edge portion generated by cut 3 may be further divided by cut 6 and cut 7; the edge portion generated by cut 9 may be further divided by cut 11 and cut 12; the edge portion generated by cut 10 may be further divided by cut 13 and cut 14; the edge portion generated by cut 16 may be further divided by cut 18 and cut 19; and the edge portion generated by cut 17 may be further divided by cut 20 and cut 21. When the triangulation technique terminates, a triangulation of the polygonal "core" of the path plus a progressive refinement along the edges may be produced.

In one embodiment, the triangulation 70 shown in FIG. 4 may be produced according to an algorithm expressed in the following pseudocode for the function HandlePath:

```
sub HandlePath(P):
    Pick a point p0 // first point in P works well
    For each path segment S in P:
        Commit the oriented triangle (p0, Sstart, Send)
        call Refine(S)
sub Refine(S):
    if S is not flat enough:
        pick a point m in the interior of S // t=0.5 works
        Split S at m into S0, S1
        Commit the oriented triangle (Sstart, m, Send)
        Refine(S0)
        Refine(S1)
```

Although the triangulation techniques are discussed above relative to Bezier paths, similar techniques may be applied to any parameterized path or more abstract curve definitions (e.g., level sets). For example, the triangulation techniques may be applied to convex paths, self-intersecting paths, multi-component paths, and filled paths. In one embodiment, the process illustrated in FIG. 4 yields a "waterproof" triangulation with no T-junctions and no risk of "peekers," regardless of the level of precision that is chosen.

Figure 5:
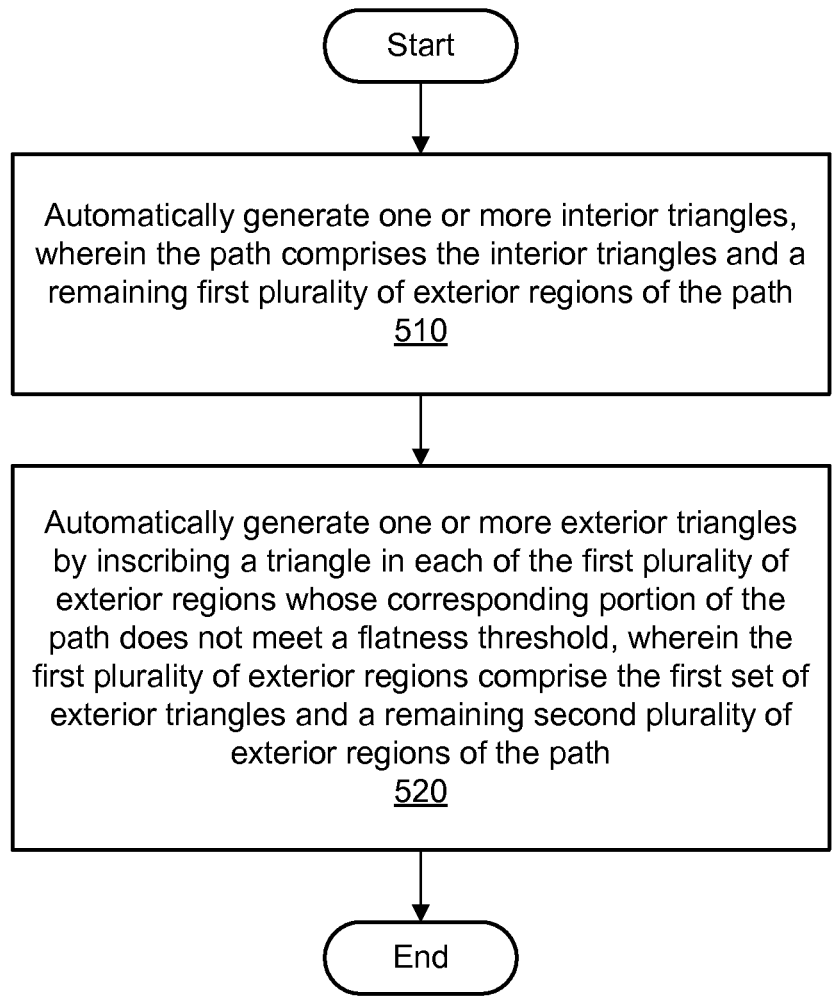
FIG. 5 is a flow diagram illustrating aspects of a method for generating a triangulation using a plurality of "cuts" according to one embodiment.

FIG. 5 is a flow diagram illustrating aspects of a method for generating a triangulation of a path using a plurality of "cuts" according to one embodiment. The path may comprise one or more path segments. The path may comprise a two-dimensional path. As shown in block 510, one or more interior triangles in the triangulation may be automatically generated. As discussed above with respect to FIG. 4, the interior triangles may comprise line segments between a starting point and an ending point of each path segment. After the operation shown in block 510, the path may comprises the one or more interior triangles plus a first plurality of exterior regions of the path. Each exterior region of the path may comprise a corresponding portion of the one or more path segments.

As shown in block 520, a first set of one or more exterior triangles in the triangulation may be automatically generated. In one embodiment, the one or more exterior triangles may be generated by inscribing a respective triangle in each of the exterior regions whose corresponding portion of the one or more path segments does not meet a flatness threshold. In one embodiment, each triangle may be generating based on a starting point, a midpoint, and an endpoint of the corresponding portion of the one or more path segments. After the operation shown in block 520, the exterior regions of the path may comprise the first set of one or more exterior triangles plus a second plurality of exterior regions of the path. As illustrated in FIG. 4, the second plurality of exterior regions may be further divided (e.g., generating a second set of one or more exterior triangles and leaving a third plurality of exterior regions of the path) while the flatness tolerance is unmet.

Figure 6:
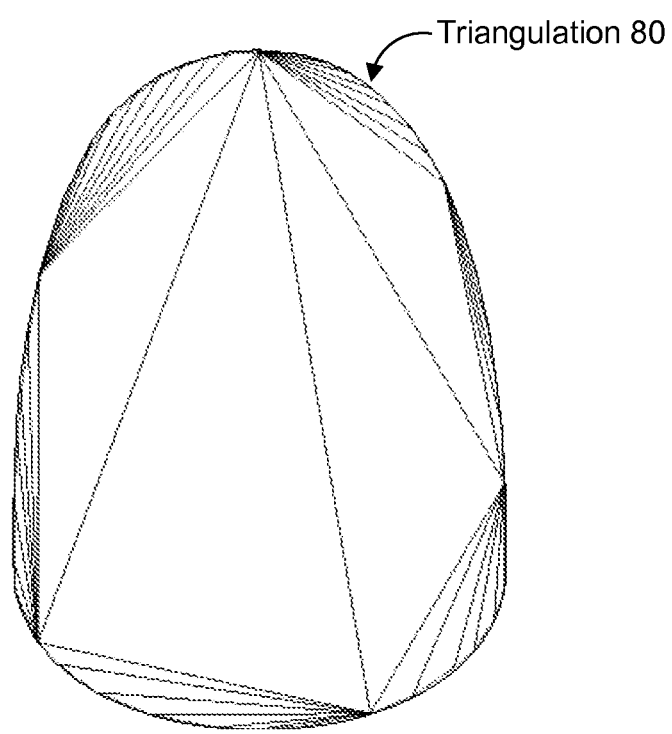
FIG. 6 is a block diagram illustrating an alternative triangulation of an object according to one embodiment.

FIG. 6 is a block diagram illustrating an alternative triangulation 80 of an object according to one embodiment. To generate the triangulation 80, a suitable number (e.g., 10) may be chosen for grouping points. An initial triangulation may be generated from the first member of each group of points (e.g., each group of 10 points). The technique may then recurse through the polygon created by these "first in group" points. Thus, curved edges may be locally triangulated as shown in the alternative triangulation 80.

Because the techniques discussed above with respect to FIGS. 4 and 5 may not use information about one segment of the path to influence the triangulations of other segments, a path may be processed in a "streaming" fashion such that information from each path segment need not be stored after the segment is processed. Path segments may be processed one at a time, triangles may be generated accordingly, and the processing of each subsequent segment may then start from scratch. This "streaming" property may minimize memory consumption and data movement and may also substantially bypass the at least $O(n \log(n))$ requirement of conventional disjoint triangulation algorithms.

Due to the independence of path segments, the boundary segments of the region to be triangulated may be submitted in any order (i.e., edge segments need not be connected end to end in one embodiment). For "color change boundary" imaging models such as the model used in Adobe Flash®, a triangulator may be built for each "paint type" (color), given a particular frame. If any given edge in the list of edges includes the current color, then the edge may be sent to the triangulator for that color, ensuring that the edge is oriented consistently (e.g., the interior is on the left). After completing the frame's edge list and thus submitting all the edges for the current color, all the edges may form a closed path describing the interior points. The triangulation may be complete and may then be painted as follows.

On the host system (e.g., the CPU), a triangle reducer may render into a grayscale alpha buffer that is analogous to a multisampled stencil buffer on the GPU. The triangle reducer may process the triangles one at a time without a need to perform sorting or intersecting operations. In one embodiment, the geometry of a path to be rendered may be provided to the GPU 100 in the form of a triangulation generated by the techniques discussed above. The color and alpha values of the object may be provided to the GPU 100 in a different manner. In one embodiment, color and alpha rendering may be disabled on the GPU (e.g., with alpha of zero or by modifying the color write channels).

The triangles in the triangulation may be rendered into a stencil buffer of the GPU as follows. The stencil buffer may comprise a multisampled buffer. For the even/odd rule, the stencil operation may be set to INVERT. For the winding rule, the stencil operation may be set to INC for forward-facing triangles and DEC for reverse-facing triangles (e.g., by using two rendering passes, one culling forward and the other backward, or by selecting the operation based upon the triangles' facing). Once the stencil buffer is filled in, a rectangle is built that contains the entire original path. The rectangle may comprise two triangles. The colors of the path are established (e.g., by using one or more pixel shaders), and the path is rendered with the stencil test turned on. Because the pixel shaders may be invoked only on these two triangles, performance concerns about spiky triangulations may be minimized. Multiple coverage of pixels by triangles may also be minimized to generate further shading efficiency.

In one embodiment, the triangulation techniques discussed above may be used to generate a collection of triangles that successively approximate the polygon or object at increasingly higher resolutions (e.g., of a target imaging device 190). The triangulation may comprise a sorted list of triangles so that the "important" triangles are located near the front of the list while progressively less important "refinement" triangles are further out in the list. The triangulation may be sent once to the GPU 100, stored in a vertex buffer on the GPU 100, and used a plurality of times for rendering at a plurality of resolutions. In rendering the triangulation using the GPU 100, the GPU's ability to draw only a portion of a vertex buffer may be advantageously used to render only those triangles whose inclusion is important at a particular resolution.

As discussed above with respect to FIGS. 4 and 5, the "core" of the triangulation is generated first and therefore stored first in the list of triangle vertices. The edge triangles are then generated up to a first threshold of precision. The number of triangles in the list may be stored for the first precision value. In one embodiment, the precision value itself may also be stored. The precision may be increased, additional triangles may be generated, and the number of triangles at the second threshold of precision may be stored (e.g., along with the second precision value itself). This process may iterate until a high precision limit is reached. In one embodiment, the process may iterate until the triangulation is precise enough for a large zoom such as a 1000% zoom. In one embodiment, the generation of a multi-resolution triangulation in this manner may not be "streamed" as discussed previously due to the retention of the edge regions in memory for later refinement purposes. When the path is rendered, it is determined which level of precision and corresponding number of triangles is appropriate for the target resolution. The vertex buffer (e.g., cached on the GPU) may then be rendered up to the number of triangles determined by the desired level of precision. Remaining triangles in the triangulation may be discarded from the rendered path (i.e., not displayed).

In one embodiment, triangulation techniques similar to those discussed above may be applied to stroked paths. A stroked path may comprise a stroke region comprising the set of points within a perpendicular distance D (i.e., an offset) of a path (e.g., a Bezier curve). The boundary of a stroke region may be complex and difficult to represent mathematically. An offset curve in the boundary of the stroke region may comprise a set of points at a perpendicular distance D from the original curve. Because the offset curve may not itself be a Bezier curve, previous approaches have used a complex process of approximation in expressing the offset curve as a path (e.g., of Beziers). This complex process of approximation may be avoided by applying triangulation techniques as discussed above, given a way of finding points on the boundary of the stroke region which lie between other points on the boundary. As discussed above, the triangulation techniques may produce a minimally overlapping triangulation that requires no post-processing (e.g., sorting).

In one embodiment, a stroke triangulation may be generated without computing an intermediate stroke envelope (also referred to herein as a bounding path). The stroke envelope may comprise a complex path (e.g., one or more Bezier curves) that approximate the boundaries of the stroke region. By avoiding the computational expense associated with computing and filling a stroke envelope, stroked paths may be triangulated and rendered faster. Instead of computing the boundary of the stroke region (e.g., the stroke envelope) and then triangulating it, a triangulation that approximates the stroke region may be generated directly. The output of the triangulation may be passed to a triangle rasterizer, thus bypassing the expensive step of producing a complex path representing the stroke region.

As discussed above, a "multi-resolution" triangulation may be generated when the triangulation techniques discussed herein are applied to stroked paths. Triangles in the triangulation of a stroked path may be stored in order of refinement. The order of refinement may correspond to the order in which the triangles are generated. In one embodiment, the order of refinement may begin with one or more (typically two) core triangles. After the core triangles, the order of refinement may then include triangles generated at a first level of refinement. After the triangles at the first level of refinement, the order of refinement may include triangles generated at additional levels of refinement, one level after another. The triangles may be stored in the order of refinement in a list. The triangles may be generated until a refinement threshold is met. The refinement threshold may comprise a threshold of precision indicating a desired precision of the triangulation. The triangulation of a stroked path may be generated once, cached (e.g., on the GPU), and potentially reused (e.g., while zooming and/or panning). When the desired precision is reached in rendering a stroked path, the remaining triangles in the list may be ignored because they represent levels of refinement that are deemed to be unnecessary to display at the desired precision.

The techniques discussed herein for triangulating a stroked path may be applied to various types of paths such as Bezier paths, parameterized paths, and/or more abstract curve definitions (e.g., level sets). The techniques discussed herein for triangulating a stroked path may be applied to simple paths or compound (e.g., multi-curve) paths. In order to preserve the "multi-resolution" nature of the triangulation, curved graphical elements of a stroke (e.g., round caps and round joins) may be generated as discussed above with respect to FIGS. 3A, 3B, and 5.

Figure 7A:
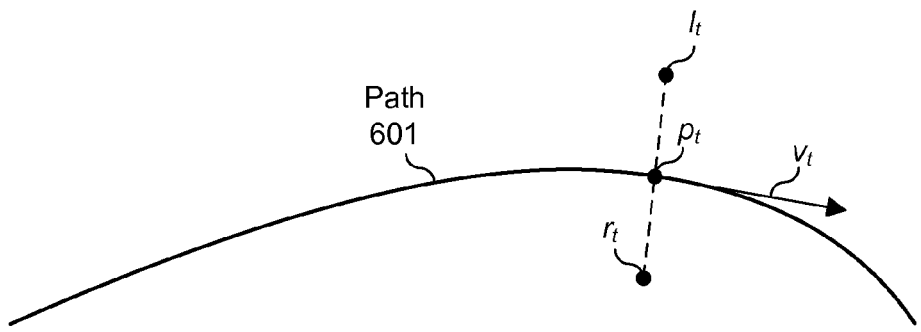
FIG. 7A is a diagram illustrating a path which may be triangulated with a stroke according to one embodiment.

FIG. 7A is a diagram illustrating a path 601 which may be triangulated with a stroke according to one embodiment. In the example shown in FIG. 7, the path 601 may be defined by a Bezier curve P(t). For a given parameter t, the corresponding point $p_t$ on the curve 601 and the tangent vector $v_t$ at that point may be computed. The "offset points" at t, referred to herein as $l_t$ and $r_t$, may also be computed. As used herein, the use of '1' to label points may indicate a direction counterclockwise from the tangent while the use of 'r' to label points may indicate a direction clockwise from the tangent. The offset points $l_t$ and $r_t$ may comprise offsets from $p_t$ in the directions perpendicular to $v_t$. The offset distance on either side of the path may be one-half of the width of the stroke.

Figure 7B:
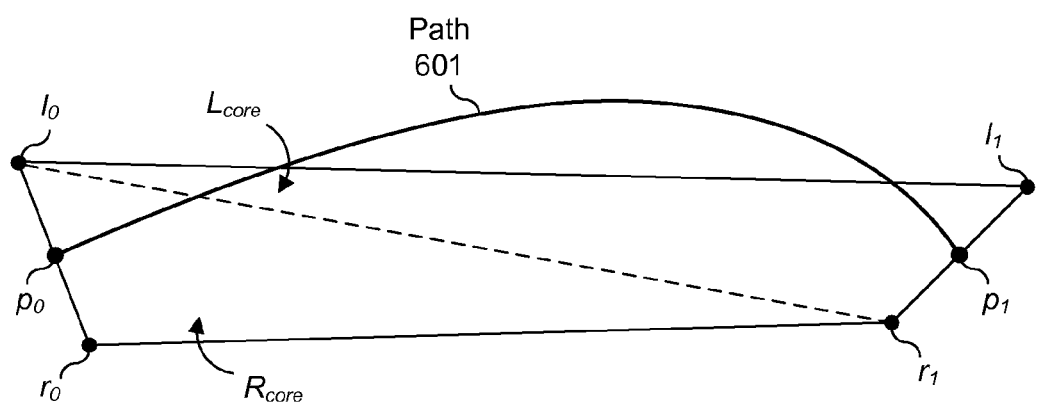
FIGS. 7B, 7C, and 7D are diagrams illustrating the triangulation of the stroked path using successive refinement according to one embodiment.

FIG. 7B is a diagram illustrating the triangulation of the stroked path 601 according to one embodiment. In a first step of the triangulation of the path 601, two "core" triangles $L_{core}$ and $R_{core}$ may be generated such that $L_{core}=(l_0, l_1, r_1)$ and $R_{core}=(r_1, r_0, l_0)$. The "core" triangles $L_{core}$ and $R_{core}$ may be oriented triangles. In one embodiment, the techniques discussed herein for triangulating a stroked path may use a winding-number-based triangle renderer. In a triangle rendered based on winding numbers, clockwise coverage may "cancel" counterclockwise coverage.

The triangulation of the stroked path 601 may be successively refined (e.g., through iteration) until a desired level of refinement is reached. The exterior edges of the triangulation may be described by the "t parameter" values at their endpoints. Thus each exterior edge may be thought of as a line approximating the stroke region's boundary for the span of t parameters which define its endpoints. At the point in the triangulation process illustrated in FIG. 7B, the single span describing the single flat edge on each side is the span [0, 1]. It may then be determined whether the span's current linear approximation meets a given accuracy requirement a. If it does meet the accuracy requirement, then the triangulation process may end. If it does not meet the accuracy requirement, then the triangulation process may continue with the generation of additional triangles as illustrated in FIG. 7C.

Figure 7C:
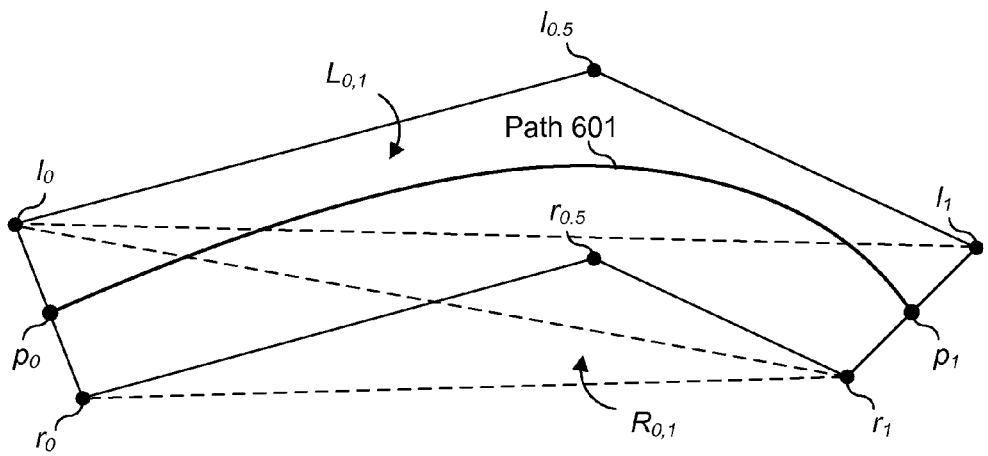

FIG. 7C is a diagram further illustrating the triangulation of the stroked path 601 according to one embodiment. Two new triangles $L_{0,1}=(l_0, l_{0.5}, l_1)$ and $R_{0,1}=(r_1, r_{0.5}, r_0)$ may be added to the triangulation of the stroked path 601. The two new triangles may correspond to a first level of refinement in the triangulation of the stroked path 601. According to the nomenclature used for refinement triangles herein, $L_{a,b}=(l_a, l_{(a+b)/2}, l_b)$ and $R_{a,b}=(r_b, r_{(a+b)/2}, r_a)$. The "right-handed" triangles may be reversed in order. As shown in FIG. 7C, the original span [0, 1] may be split into two spans [0, 0.5] and [0.5, 1]. After refinement by the addition of $L_{0,1}$ and $R_{0,1}$, the flat edge of original span [0, 1] has been refined by the flat edges of the spans [0, 0.5] and [0.5, 1]. The refinement triangles $L_{0,1}$ and $R_{0,1}$ may therefore reflect the splitting of parameter spans such that each split yields one left triangle and one right triangle. The points $l_{0.5}$ and $r_{0.5}$ may be chosen as points orthogonal to the tangent at a point in the middle of the path (e.g., the midpoint). For example, the points $l_{0.5}$ and $r_{0.5}$ may be offset by half the stroke width along a line orthogonal to the tangent at the midpoint of the path.

The two new triangles $L_{0,1}$ and $R_{0,1}$ may share an interior edge with the linear approximation for the span which generated it. In this manner, the triangulation may be made watertight and "peekers" may be eliminated in one embodiment. In this example, the triangle $R_{0,1}$ actually overlaps both $L_{core}$ and $R_{core}$. Because the core triangles $L_{core}$ and $R_{core}$ are both oriented clockwise while $R_{0,1}$ is oriented counterclockwise, the new triangle $R_{0,1}$ may cancel portions of the previously generated triangles.

Figure 7D:
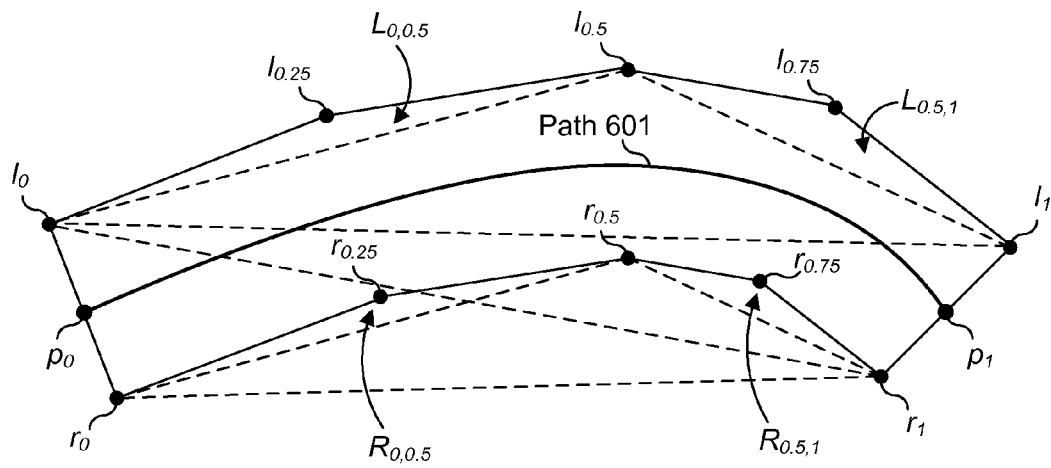

FIG. 7D is a diagram further illustrating the triangulation of the stroked path 601 according to one embodiment. Using the techniques discussed above with respect to FIG. 7C, four new triangles may be added to the triangulation of the stroked path 601: $L_{0,0.5}=(l_0, l_{0.25}, l_{0.5})$, $L_{0.5,1}=(l_{0.5}, l_{0.75}, l_1)$, $R_{0.5,1}=(r_1, r_{0.75}, r_{0.5})$, and $R_{0,0.5}=(r_{0.5}, r_{0.25}, r_0)$. The four new triangles may correspond to a second level of refinement in the triangulation of the stroked path 601.

The triangulation may be further refined by iterating on the span list until every member span meets the tolerance a. When the refinement is complete, the number of triangles $n_a$ may be stored (e.g., on the GPU) along with the actual triangles in the triangulation. As discussed above, the triangles may be stored in a list according to their level of refinement. The stored triangulation may be retrieved, and the triangulation may be rendered again using the stored triangles at any tolerance up to a. If additional triangles are needed, new refinement triangles may be added to the stored triangles to increase the refinement level of the triangulation. When rendering the stroked path, the list of (precision, $num_{13}$ triangle) pairs may be referenced to determine which level of refinement is appropriate for the current resolution. When rendering anything up to tolerance a with the stored triangulation, for example, the triangulation may stop after retrieving the first $n_a$ triangles. In one embodiment, stopping after any number of triangles or any level of refinement produces a watertight triangulation.

In one embodiment, the initial triangulation of the stroked path may be generated for a high precision such as that required for a 1000% zoom. The number of triangles generated at this high precision may typically be large. In one embodiment, all of the subsequent triangulations of the stroked path may be expected to re-use a portion of the triangles generated in the initial triangulation. If necessary, additional triangles may be generated for an even higher precision after the previously generated triangles have been exhausted.

In one embodiment, the refinement threshold or precision threshold may be met when all the member spans meet a given tolerance. In determining whether a member span meets the tolerance a, a standard measure of error may be used. In one embodiment, the standard measure may comprise the "flatness" of an offset curve (e.g., a stroke boundary). The "flatness" of the offset curve may comprise a measure of the maximum deviation of the offset curve from the line segment which connects its endpoint. In one embodiment, the measure by which the flatness in the offset curve is approximated by the curvature of the original may be determined as follows. The original curve and all of its offset curves may have osculating circles sharing a common center. An osculating circle of a sufficiently smooth plane curve at a given point on the curve may be defined as the circle having a center that lies on the inner normal line and having the same curvature as that of the given curve at that point. Therefore, the family of offset curves from a given curve may share the same center. Both the osculating circle and the offset curves may be moved perpendicular to the tangent on the original curve. If radius of curvature at a point P of the original curve is R, then the resulting radius of curvature at the corresponding point P' of the offset curve is R+d. For a signed radius of curvature where the sign of d indicates whether it is a left or right offset, it may be observed that $R_{offset}=R_{original}+d$. By obtaining a bound on the radius of curvature in a region of the original curve, a bound on the curvature of the corresponding region of the offset curve may be obtained. A bound on the flatness may thus be obtained, and the bound on the flatness may comprise a measure of whether a given triangulation is sufficiently refined.

In one embodiment, the triangulation of a stroked path may be implemented in accordance with the following pseudocode:

```
void RefineUpToTolerance(bez, tris, spans, tol)
{
    int i = 0;
    while (i < spans.count)
    {
        start = spans[i].start;
        end = spans[i].end;
        if (IsGoodEnough(bez, start, end, tol))
            i++;
        else
        {
            // add "left" triangle refinement for this span
            tris.add(  Offset(bez, start, d)
                       Offset(bez, (start+end)/2, d),
                       Offset(bez, end, d));
```

```
            // add "right" triangle refinement for this span
            tris.add( Offset(bez, end, -d)
                      Offset(bez, (start+end)/2, -d),
                      Offset(bez, start, -d));
            // split the span
            spans.split(i);
        }
    }
}
```

In one embodiment, further aspects of the triangulation of a stroked path may be implemented in accordance with the following pseudocode:

```
CTriangles,CStops TriangulateStroke(bez, d, mintol, k, num)
{
    CTriangles tris;
    CStops stops;
    CSpans spans;
    // add core triangles
    tris.add(Offset(bez,0,d), Offset(bez,1,d), Offset(bez,1,-d));
    tris.add(Offset(bez,1,-d), Offset(bez,0,-d), Offset(bez,0,d));
    // add the initial span
    spans.append([0,1])
    curtol = mintol;
    for (int n = 0; n < num; n++)
    {
        RefineUpToTolerance(bez, tris, stops, spans, curtol);
        stops.add(curtol, tris.count);
        curtol *= k;
    }
    return tris,stops
}
```

Figure 8:
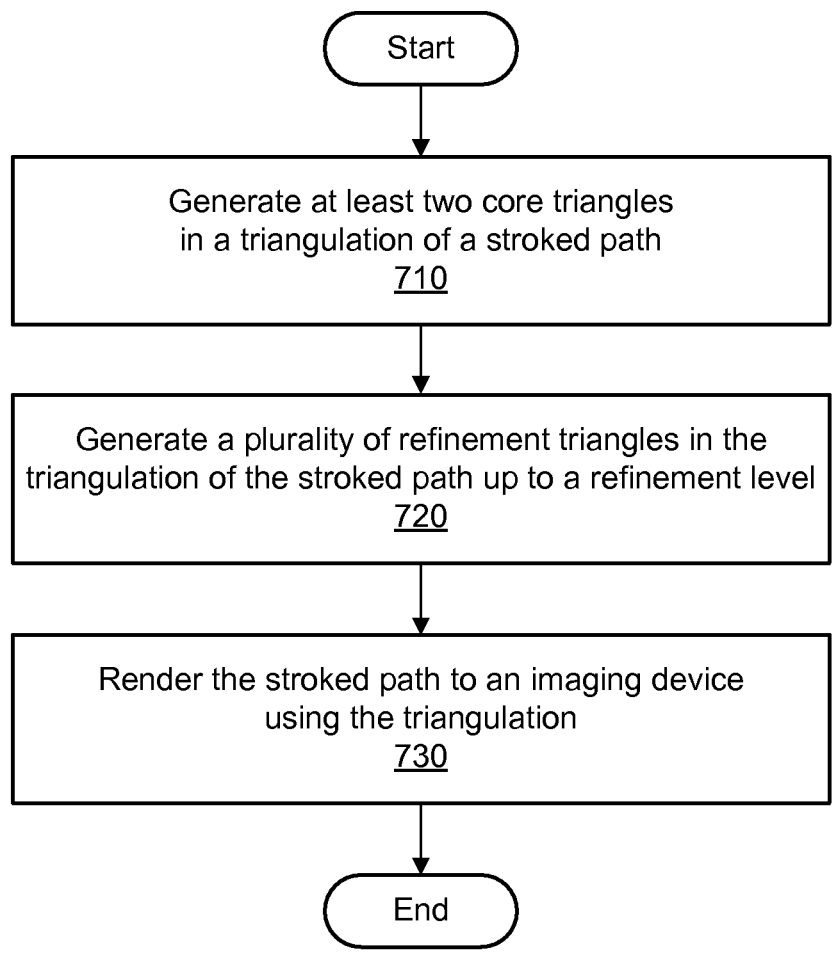
FIG. 8 is a flow diagram illustrating aspects of a method for generating a triangulation of a stroked path up to a refinement threshold according to one embodiment.

FIG. 8 is a flow diagram illustrating aspects of a method for generating a triangulation of a stroked path up to a refinement threshold according to one embodiment. As shown in 710, one or more core triangles in a triangulation of a stroked path may be generated. As shown by way of example in FIG. 7B, two core triangles may typically be generated.

As shown in 720, a plurality of refinement triangles in the triangulation of the stroked path may be generated. In one embodiment, the triangulation of the stroked path may be successively refined until a refinement threshold is met. Thus, generating the refinement triangles may comprise generating a second portion of the refinement triangles in response to determining that at least one edge approximating a curve in a first portion of the refinement triangles fails to meet a refinement threshold. As shown in 730, the stroked path may be rendered to an imaging device based on the one or more core triangles and the plurality of the refinement triangles in the triangulation of the stroked path. In rendering the stroked path, the triangulation may be sent to a GPU.

FIG. 9 is a block diagram illustrating constituent elements of a computer system 900 that is configured to implement embodiments of the system and method for triangulation. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a GPU such as the GPU 100 illustrated in FIG. 2. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the triangulation techniques described herein may be partly or fully resident within the memory 920 at the computer system 900 at any point in time. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 9, as illustrated by the ellipsis shown.

In various embodiments, the elements shown in FIGS. 3A, 3B, 5, and 8 may be performed in a different order than the illustrated order. In FIGS. 3A, 3B, 5, and 8, any of the operations described in the elements may be performed programmatically (i.e., by a computer according to a computer program). In FIGS. 3A, 3B, 5, and 8, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
   executing computer program instructions on a processor of a computer system to perform:
      identifying endpoints of a stroked path;
      determining offset points that are offset from the endpoints of the stroked path;
      generating one or more core triangles using the determined offset points as vertices of the core triangles in a triangulation of the stroked path to approximate a stroke region of the stroked path, the one or more core triangles in the triangulation being generated without computing an intermediate stroke envelope; and generating a plurality of refinement triangles in the triangulation of the stroked path until a refinement threshold for a boundary of the stroked region is met.

2. The method as recited in claim 1, further comprising:
storing the one or more core triangles and the plurality of refinement triangles in an order of refinement.

3. The method as recited in claim 1, wherein generating the plurality of refinement triangles in the triangulation of the stroked path comprises:
generating a first portion of the plurality of refinement triangles comprising at least one edge approximating an offset curve of the stroked path;
determining that the at least one edge approximating the offset curve of the stroked path fails to meet the refinement threshold; and
generating a second portion of the plurality of refinement triangles in response to determining that the at least one edge approximating the offset curve of the stroked path fails to meet the refinement threshold.

4. The method as recited in claim 3, wherein the first portion of the plurality of refinement triangles is stored before the second portion of the plurality of refinement triangles in a data structure.

5. The method as recited in claim 1, further comprising:
storing the one or more core triangles and the plurality of refinement triangles in an order of refinement; and
storing a value indicative of a refinement level of the triangulation of the stroked path with the one or more core triangles and the plurality of refinement triangles.

6. The method as recited in claim 5, further comprising:
determining a new refinement level for displaying the stroked path;
retrieving the one or more core triangles;
retrieving a portion of the plurality of refinement triangles based on the new refinement level; and
rendering the stroked path to the imaging device based on the one or more core triangles and the portion of the plurality of refinement triangles.

7. The method as recited in claim 1, further comprising rendering the stroked path to an imaging device based on the one or more core triangles and the plurality of refinement triangles in the triangulation of the stroked path.

8. The method as recited in claim 1, wherein the plurality of refinement triangles comprise a first portion of the plurality of refinement triangles generated at a first refinement level and a second portion of the plurality of refinement triangles generated at a next refinement level, wherein each refinement triangle in the second portion shares an edge with an exterior edge of one refinement triangle in the first portion, and wherein the triangulation of the stroked path is watertight.

9. The method as recited in claim 1, wherein the offset points lie along lines perpendicular to tangent vectors at the endpoints of the stroked path.

10. A computer-readable storage memory comprising stored program instructions that are computer-executable to implement:
identifying endpoints of a stroked path;
determining offset points that are offset from the endpoints of the stroked path;
generating one or more core triangles using the determined offset points as vertices of the core triangles in a triangulation of the stroked path to approximate a stroke region of the stroked path, the one or more core triangles in the triangulation being generated without computing an intermediate stroke envelope; and
generating a plurality of refinement triangles in the triangulation of the stroked path until a refinement threshold for a boundary of the stroked region is met.

11. The computer-readable storage memory as recited in claim 10, wherein generating the plurality of refinement triangles in the triangulation of the stroked path comprises:
generating a first portion of the plurality of refinement triangles comprising at least one edge approximating an offset curve of the stroked path;
determining that the at least one edge approximating the offset curve of the stroked path fails to meet the refinement threshold; and
generating a second portion of the plurality of refinement triangles in response to determining that the at least one edge approximating the offset curve of the stroked path fails to meet the refinement threshold.

12. The computer-readable storage memory as recited in claim 11, wherein the first portion of the plurality of refinement triangles is stored before the second portion of the plurality of refinement triangles in a data structure.

13. The computer-readable storage memory as recited in claim 10, wherein the program instructions are further computer-executable to implement:
storing the one or more core triangles and the plurality of refinement triangles in an order of refinement; and
storing a value indicative of a refinement level of the triangulation of the stroked path with the one or more core triangles and the plurality of refinement triangles.

14. The computer-readable storage memory as recited in claim 13, wherein the program instructions are further computer-executable to implement:
determining a new refinement level for displaying the stroked path;
retrieving the one or more core triangles;
retrieving a portion of the plurality of refinement triangles based on the new refinement level; and
rendering the stroked path to the imaging device based on the one or more core triangles and the portion of the plurality of refinement triangles.

15. The computer-readable storage memory as recited in claim 10, wherein the program instructions are further computer-executable to implement rendering the stroked path to an imaging device based on the one or more core triangles and the plurality of refinement triangles in the triangulation of the stroked path.

16. The computer-readable storage memory as recited in claim 10, wherein the plurality of refinement triangles comprise a first portion of the plurality of refinement triangles generated at a first refinement level and a second portion of the plurality of refinement triangles generated at a next refinement level, wherein each refinement triangle in the second portion shares an edge with an exterior edge of one refinement triangle in the first portion, and wherein the triangulation of the stroked path is watertight.

17. The computer-readable storage memory as recited in claim 9, wherein the offset points lie along lines perpendicular to tangent vectors at the endpoints of the stroked path.

18. A system, comprising:
at least one processor configured to execute stored program instructions that are executable to:
identify endpoints of a stroked path;
determine offset points that are offset from the endpoints of the stroked path;
generate one or more core triangles using the determined offset points as vertices of the core triangles in a triangulation of the stroked path to approximate a stroke region of the stroked path, the one or more core triangles in the triangulation being generated without computing an intermediate stroke envelope; and generate a plurality of refinement triangles in the triangulation of the stroked path until a refinement threshold for a boundary of the stroked region is met.

19. The system as recited in claim 18, wherein the program instructions are further executable by the at least one processor to:

store the one or more core triangles and the plurality of refinement triangles in an order of refinement.

20. The system as recited in claim 18, wherein to generate the plurality of refinement triangles in the triangulation of the stroked path, the program instructions are further executable by the at least one processor to:

generate a first portion of the plurality of refinement triangles that comprises at least one edge approximating an offset curve of the stroked path;

determine that the at least one edge approximating the offset curve of the stroked path fails to meet the refinement threshold; and generate a second portion of the plurality of refinement triangles in response to determining that the at least one edge approximating the offset curve of the stroked path fails to meet the refinement threshold.

21. The system as recited in claim 20, wherein the first portion of the plurality of refinement triangles is stored before the second portion of the plurality of refinement triangles in a data structure.

22. The system as recited in claim 18, wherein the program instructions are further executable by the at least one processor to:

store the one or more core triangles and the plurality of refinement triangles in an order of refinement; and store a value indicative of a refinement level of the triangulation of the stroked path with the one or more core triangles and the plurality of refinement triangles.

23. The system as recited in claim 22, wherein the program instructions are further executable by the at least one processor to:

determine a new refinement level for the stroked path;

retrieve the one or more core triangles; and retrieve a portion of the plurality of refinement triangles based on the new refinement level.

24. The system as recited in claim 18, wherein the plurality of refinement triangles comprise a first portion of the plurality of refinement triangles generated at a first refinement level and a second portion of the plurality of refinement triangles generated at a next refinement level, wherein each refinement triangle in the second portion shares an edge with an exterior edge of one refinement triangle in the first portion, and wherein the triangulation of the stroked path is watertight.

25. The system as recited in claim 18, wherein the offset points lie along lines perpendicular to tangent vectors at the endpoints of the stroked path.

\* \* \* \* \*

UNITED STATES PATENT AND TRADEMARK OFFICE
CERTIFICATE OF CORRECTION

Page 1 of 1

PATENT NO.        : 8,773,432 B2
APPLICATION NO.   : 12/201347
DATED             : July 8, 2014
INVENTOR(S)       : Donald P. Brown It is certified that error appears in the above-identified patent and that said Letters Patent is hereby corrected as shown below:

In the Claims

Column 18, Line 58, after "claim", delete "9", insert -- 10 --, therefor.

Signed and Sealed this
Fourteenth Day of October, 2014

Michelle K. Lee
*Deputy Director of the United States Patent and Trademark Office*